United States Patent
Stephen

(10) Patent No.: US 10,066,985 B2
(45) Date of Patent: Sep. 4, 2018

(54) DEPLOYABLE LIGHT BAFFLE

(71) Applicant: Blue Canyon Technologies Inc., Boulder, CO (US)

(72) Inventor: Steg Stephen, Erie, CO (US)

(73) Assignee: Blue Canyon Technologies Inc., Boulder, CO (US)

( * ) Notice: Subject to any disclaimer, the term of this patent is extended or adjusted under 35 U.S.C. 154(b) by 0 days.

(21) Appl. No.: 15/337,697

(22) Filed: Oct. 28, 2016

(65) Prior Publication Data

US 2017/0123114 A1 May 4, 2017

Related U.S. Application Data

(60) Provisional application No. 62/248,238, filed on Oct. 29, 2015.

(51) Int. Cl.
| | | |
|---|---|---|
| *G02B 5/00* | (2006.01) | |
| *G01J 1/02* | (2006.01) | |
| *B64G 1/10* | (2006.01) | |
| *B64G 1/36* | (2006.01) | |

(52) U.S. Cl.
CPC .............. *G01J 1/0295* (2013.01); *B64G 1/10* (2013.01); *B64G 1/361* (2013.01); *G02B 5/003* (2013.01)

(58) Field of Classification Search
CPC .. G01J 1/0295; G01J 1/02; B64G 1/10; G02B 5/003; G02B 5/005; G02B 5/00
USPC ........................................................ 359/613
See application file for complete search history.

(56) References Cited

U.S. PATENT DOCUMENTS

| | | | | |
|---|---|---|---|---|
| 1,479,112 | A * | 1/1924 | Sparks ................... | G03B 17/04 355/71 |
| 2,164,061 | A * | 6/1939 | Githens .................. | G03B 17/04 33/266 |
| 2,283,788 | A * | 5/1942 | Hurley ................... | G03B 15/00 235/118 |
| 3,489,071 | A * | 1/1970 | Mohr ..................... | G03B 17/045 396/348 |
| 4,171,891 | A * | 10/1979 | Schrader ............... | G03B 17/04 396/145 |
| 4,217,026 | A * | 8/1980 | Radovich ................. | G01J 1/06 359/611 |
| 5,979,834 | A * | 11/1999 | Falbel ..................... | B64G 1/222 126/685 |
| 6,024,458 | A * | 2/2000 | Lundgren ................ | G02B 7/00 359/399 |
| 8,188,432 | B1 * | 5/2012 | Nguyen ............... | H04N 5/2252 250/338.1 |
| 2007/0091476 | A1 * | 4/2007 | Takashima ............. | G02B 7/102 359/822 |

(Continued)

*Primary Examiner* — William R Alexander
(74) *Attorney, Agent, or Firm* — The Ollila Law Group LLC

(57) ABSTRACT

The present invention relates to a light baffle assembly including a base baffle member comprising a base wall portion positioned substantially parallel to a longitudinal axis, an upper baffle member comprising an upper wall portion coupled to an upper blade portion, the upper wall portion positioned substantially parallel to the longitudinal axis, and the upper blade portion positioned to extend inwards from the upper wall portion towards the longitudinal axis, and a resilient member configured to extend the upper baffle member away from the base baffle member.

14 Claims, 2 Drawing Sheets

(56) References Cited

U.S. PATENT DOCUMENTS

| | | | |
|---|---|---|---|
| 2008/0068711 A1* | 3/2008 | Lau | G01S 3/781 359/399 |
| 2008/0079846 A1* | 4/2008 | Ikari | G02B 27/0006 348/373 |
| 2008/0118240 A1* | 5/2008 | Hong | G03B 3/02 396/133 |
| 2009/0052066 A1* | 2/2009 | Kwan | G02B 7/005 359/823 |

* cited by examiner

DEPLOYABLE LIGHT BAFFLE

CROSS REFERENCE TO RELATED APPLICATION

This application claims priority from U.S. Provisional Patent Application No. 62/248,238 filed Oct. 29, 2015 entitled, "Deployable Light Baffle," the contents of which are incorporated herein by reference.

FIELD OF INVENTION

The present invention is in the field of light baffles. More particularly, but not exclusively, the present invention relates to a deployable light baffle.

BACKGROUND

A "cubesat," also known as a cube satellite, a "nano-sat", or a "micro-sat", is a type of miniaturized satellite. A cubesat is typically measured in volumes of "1 U" or "1 Unit", which is exactly one litre, or a 10 cm cube with a mass of no more than 1.33 kilograms. The 1 U size is commonly clustered together in 2 U, 3 U, 6 U, or 12 U configurations. Cubesats are very small compared to conventional spacecraft, and are therefore constrained for volume.

A star tracker, or a star camera, is a device used in spacecraft attitude control. Star trackers typically include an optical system, a radiance detector, and signal processing electronics, which can be used to measure the positions of stars. The optical system of a star tracker may include a lens assembly and a light baffle. Star trackers require high sensitivity, and may become confused by light contamination from the sun or the earth, drowning out the low signal from faint stars. Light baffles may therefore be used to reduce noise from scattered light in the star tracker telescope.

Light baffles typically form a cone or cylinder of around the field of view of a lens assembly to block stray light from entering the lens from outside the field of view. Blades, baffles, or ridges that point inwards from the main cone of a light baffle help reduce scattering from stray light.

Light baffle designs, which must be large enough to allow a star tracker to detect very faint stars in the presence of the very bright sunlight, typically extend 5-40 cm in length. On a cubesat, prior designs have included a fixed light baffle, which may cover a large portion of the 10 cm length of a 1 U unit.

It is an object of the present invention to provide a light baffle which overcomes the disadvantages of the prior art, or at least provides a useful alternative.

SUMMARY

A light baffle assembly is provided. The light baffle assembly includes a base baffle member, an upper baffle member, and a resilient member. The base baffle member includes a base wall portion substantially parallel to a longitudinal axis. The upper baffle member includes an upper wall portion coupled to an upper blade portion. The upper wall portion is substantially parallel to the longitudinal axis. The upper blade portion is positioned to extend away from the upper wall portion towards the longitudinal axis. The resilient member is configured to extend the upper baffle member away from the base baffle member.

A method of operating a light baffle assembly including a base baffle member, an upper baffle member, a resilient member, and an actuator is provided. The method includes operating the actuator to release a connection between the base baffle member and the upper baffle member. The resilient member is configured to extend the upper baffle member away from the base baffle member. The base baffle member comprises a base wall portion positioned substantially parallel to a longitudinal axis. The upper baffle member comprises an upper wall portion coupled to an upper blade portion. The upper wall portion is positioned substantially parallel to the longitudinal axis, and the upper blade portion is positioned to extend inwards from the upper wall portion towards the longitudinal axis.

BRIEF DESCRIPTION OF THE DRAWINGS

Embodiments of the application will now be described, by way of example only, with reference to the accompanying drawings in which.

DETAILED DESCRIPTION OF PREFERRED EMBODIMENTS

Figure 1:
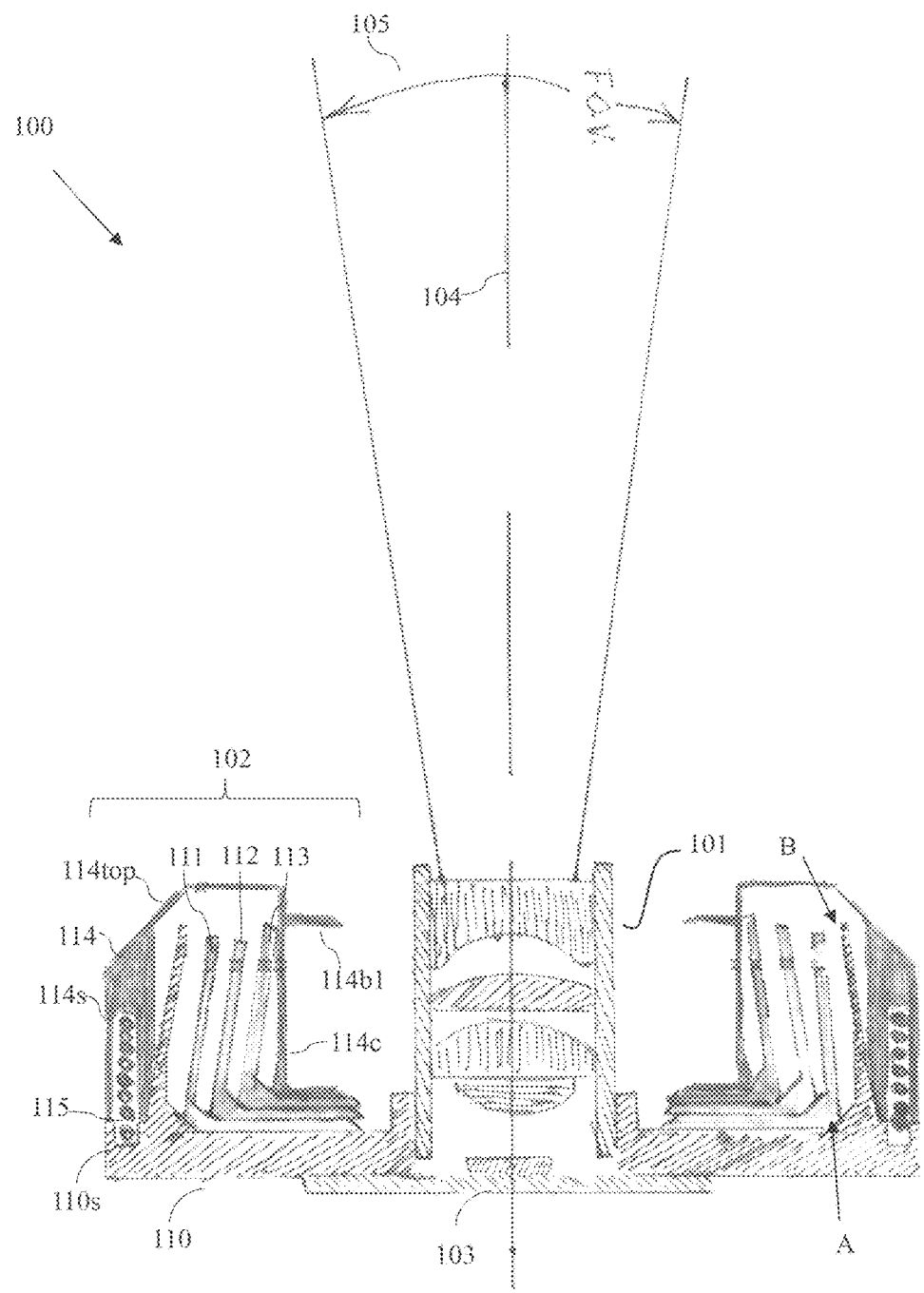
FIG. 1: depicts an optical assembly 100, in accordance with an example.
Figure 2:
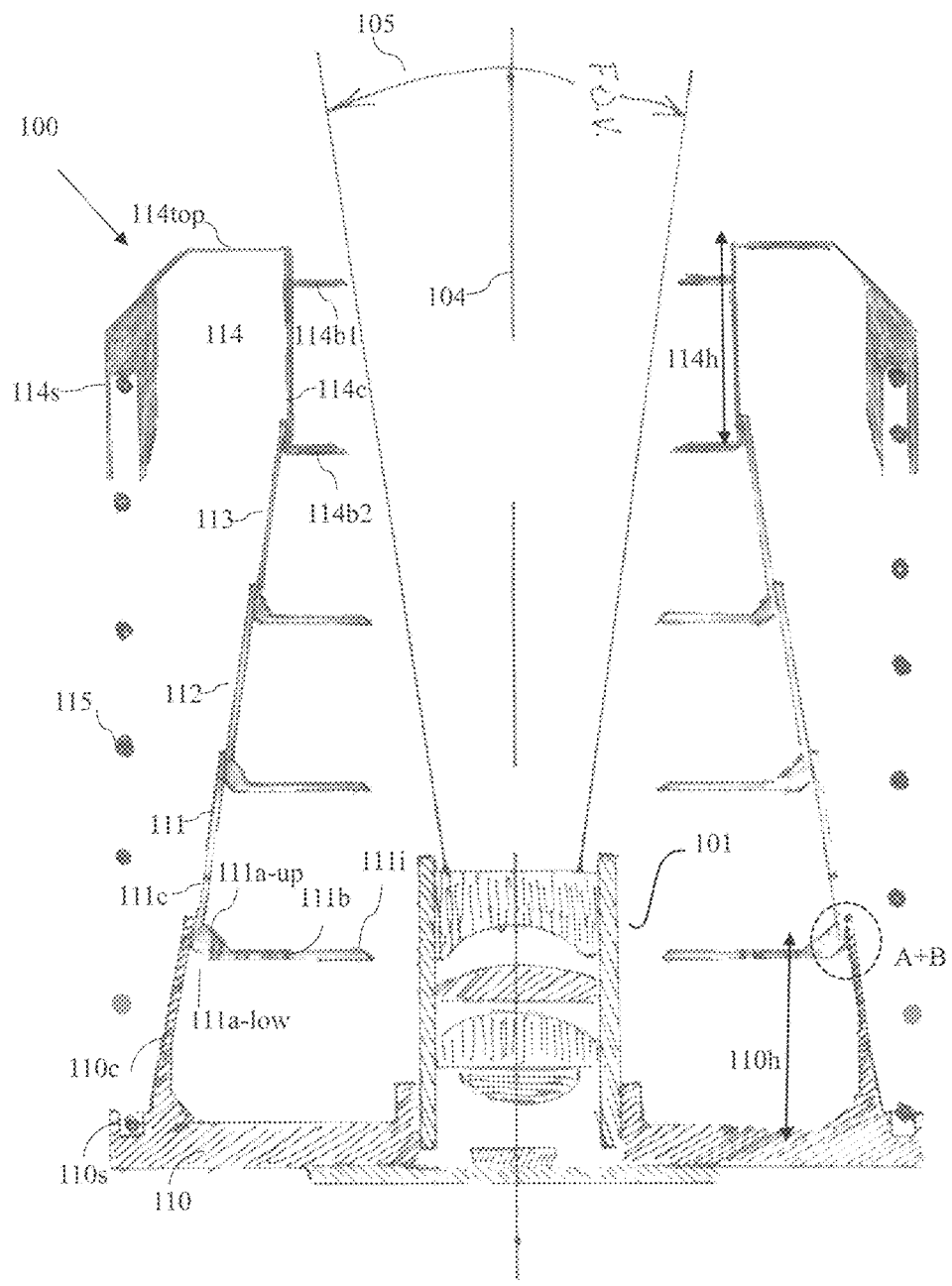
FIG. 2: depicts an optical assembly 100, in accordance with an example.

The present Application describes a deployable light baffle. FIGS. 1 and 2 and the following description depict specific examples to teach those skilled in the art how to make and use a deployable light baffle. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

FIG. 1 depicts a cutaway view of optical assembly 100 with light baffle assembly 102 in a stowed or retracted position, and FIG. 2 depicts a cutaway view of optical assembly 100 with a light baffle assembly 102 in a deployed or extended position. In examples, light baffle assembly 102 may be placed in a stowed position during launch and then actuated into a deployed position after launch. Optical assembly 100 includes a lens assembly 101, light baffle assembly 102, and a detector 103.

Lens assembly 101 may include any combination of optics for use with a star tracker, as will be understood by those of skill in the art. Lens assembly 101 features an optical axis 104 along which lens assembly 101 may have a substantial degree of rotational symmetry. Lens assembly 101 further includes a field of view 105. Field of view 105 is a substantially conical solid angle though which lens assembly 101 will collect light to be received at detector 103.

Detector 103 may be any type of detector known to those of skill in the art for use with a star tracker.

Light baffle assembly 102 includes base baffle member 110, upper baffle member 114, and resilient member 115. Light baffle assembly 102 may further include one or more of: first intermediate baffle member 111, second intermediate baffle member 112, and third intermediate baffle member 113.

Base baffle member 110 may include a substantially "L"-shaped cross-section, including a base wall 110c section. In examples, the base wall portion 110c section of base baffle member 110 may be formed as a cross section of a cylinder or a cone around longitudinal axis 104. In examples, base wall portion 110c may be substantially parallel to a longitudinal axis, or the optical axis 104, of the optical assembly 100, with a base wall portion height 110h. In examples, substantially parallel, may mean that wall portion 110c itself may be within 0-10°, 0-30°, or 0-45° of parallel to longitudinal axis 104.

The base wall portion 110c section of base baffle member 110 may substantially surround the longitudinal axis 104 to block light from entering lens assembly 101 from outside the field of view 105. In examples, substantially surrounds may mean surrounding 70% to 100% of a perimeter of an area around longitudinal axis 104, for example field of view 105. The base baffle member 110 may further include a bottom portion perpendicular to optical axis 104. The bottom portion may serve as a base for attachment of the light baffle assembly 102 to a star tracker assembly or the optical assembly 100.

Light baffle assembly 102 may further include one or more of: first, second, or third intermediate baffle members 111, 112, and 113. First, second, and third intermediate baffle members 111, 112, and 113 may also be substantially "L" shaped in cross section, similar to base baffle member 110. For example, first intermediate baffle member may include a first wall portion 111c that substantially surrounds longitudinal axis 104 to create a cross section of a cone or cylinder capable of blocking stray light, much like base wall portion 114c.

First, second, and third intermediate portions 111, 112, and 113 may further include blade portions, or baffles, to prevent scattered light from entering lens assembly 101. For example, first intermediate baffle member may include first blade portion 111b. First blade portion 111b may extend inward from first wall portion 111c towards longitudinal axis 104. In examples, first blade portion may be substantially perpendicular to longitudinal axis 104. In further examples, however, first blade portion may be oriented to be positioned within 0-30° of perpendicular to longitudinal axis 104. Those skilled in the art will recognize that the "L" shaped cross section could be manufactured from a single physical part, or fabricated by joining two or more parts together.

First blade portion 111b extends towards the longitudinal axis to an innermost point 111i. In examples, the length between each wall portion and the innermost point of each respective intermediate baffle member, for example the length between wall portion 111c and innermost point 111i, may be selected to allow for an opening in the respective blade portion that is wide enough to avoid obstructing field of view 105, and narrow enough to prevent scattered light outside the field of view from entering lens assembly 101.

Light baffle assembly 102 further includes upper baffle member 114. Upper baffle member 114 includes an upper wall portion 114c that functions much like the base wall portions of the intermediate member wall portions. Upper baffle member 114 may further include a first upper blade member 114b1 and a second upper blade member 114b2.

The examples of FIGS. 1 and 2 are intended to be limiting, however. In examples, any baffle member may include any number of blades, including zero blades.

FIG. 1 depicts light baffle assembly 102 in a stowed position. In the stowed position, a resilient member 115 is compressed. The resilient member 115 is a coil spring in the example, but as those skilled in the art will readily understand, any type of spring mechanism may be used.

The base baffle member 110, first, second, and third intermediate baffle members 111, 112, and 113, and upper baffle member 114 are nested together into a compressed stack when stowed. Each of base baffle member 110, first, second, and third intermediate baffle members 111, 112, and 113, and upper baffle member 114 include an "L" shaped portion with a respective lower and upper angled section. For example, it may be seen in FIG. 2 that first intermediate baffle portion 111 includes a first lower angled portion 111a-low and a first upper angled portion 111a-up. When light baffle assembly 102 is in a stowed position, the adjacent lower and upper angled portions of each baffle member may be adjacent to one another. In some examples, the adjacent lower and upper angled portions of each baffle member may come to rest upon one another. Advantageously, by securing the components of the light baffle assembly against one another during a launch, damage to the light baffle, star tracker or spacecraft upon launch may be prevented.

It may further be seen in FIG. 1 that upper baffle member 114 may include a seat portion 114s for resilient member 115. Seat portion 114s may include any surface on upper baffle member 114 that resilient member 115 may contact to extend upper baffle member 114 away from base baffle member 110. In examples, seat portion 114 may be formed in the shape of an annular groove in upper baffle member 114. The bottom edges of the protected groove of seat portion 114s may further come into contact with base baffle member 110 when light baffle assembly 102 is in a stowed position to provide an enclosure for resilient member 115 when stowed. Seat portion 114s may further provide a secure seat for a first end of the resilient member after deployment. Base baffle member 110 may also include a base seat portion 110s where a second end of the resilient member may be seated.

It may further be seen in FIG. 1 that upper baffle member 114 may include a top wall portion 114top. Top wall portion 114top may couple the upper wall portion 114c to the seat portion 114s. Together the upper wall portion 114c, top wall portion 114top, and seat portion 114s may provide a "U" shaped enclosure around the one or more nested baffle members, forming a protective cover for light baffle assembly 102 when stowed.

In examples, light baffle assembly 102 may further include an actuator (not pictured). Upper baffle member 114 may be secured to the base baffle member 110 until released using the actuator. Any actuator commonly known to those of skill in the art may be used. Upon actuation, resilient member 115 may be free to extend and deploy light baffle assembly 102.

FIG. 2 depicts light baffle assembly 102 in a deployed position. In the deployed position the resilient member is extended, releasing the light baffle assembly 102 to its full operational or extended position. Each of the first, second, and third intermediate baffle members 111, 112, and 113, and the upper baffle member 114 are free to move in the direction of spring extension substantially parallel to the longitudinal axis 104.

As the baffle members extend, a first contact portion of a reference member may come into contact with a second contact portion of an adjacent member of the light baffle assembly 102. The first contact portion of the reference member, for example first contact portion A of first intermediate baffle member 111, may be positioned on the base side of the wall portion of the reference member, exterior to the longitudinal axis. The second contact portion of the adjacent member, for example second contact portion B, may be positioned on the upper side of a wall portion, interior to the wall portion. As it may be seen in the dotted circle of FIG. 2, first contact area A of first intermediate member 111 may come into contact with second contact area B of base baffle member 110 when light baffle assembly 102 is deployed. The contact between first contact area A and second contact area B may prevent first intermediate baffle member 111 from deploying beyond the full height of base baffle member 110, thereby retaining intermediate baffle member 111 within the light baffle assembly 102.

A portion of second contact area B may include a narrower circumference than a portion of first contact area A, which may further serve to prevent first intermediate baffle member 111 from extending beyond the height of the base baffle member. In further examples, either first contact area A or second contact area B may include an additional section of material that protrudes further towards the opposing baffle member at the junction of first contact area A and second contact area B (not pictured). For example, first contact area A or second contact area B may include a 10° inclination to prevent first intermediate baffle member 111 from extending beyond the height of base baffle member 110. The same mechanisms described with respect to first and second contact areas A and B may apply to each adjacent baffle pairing included in light baffle assembly 102 to secure the baffle members against one another when deployed.

In examples, light baffle assembly 102 may include any number of intermediate baffle members. In examples, light baffle assembly 102 may include zero intermediate baffle members.

In examples, the base baffle and upper baffle, in addition to any intermediate baffles that may be included, may be manufactured from a continuous strip of material (not pictured). The light baffle assembly may comprise, for example, of a single spiral and corkscrew wound structure that may nest around the lens assembly 101 in a single plane when stowed or extend outward in a spiral cone when deployed. In a further example, the resilient member may be integrated into the continuous strip of material, so that the continuous strip of material may use its own resilient properties as a spring element to cause deployment when released.

In further examples the light baffle assembly may include additional resilient members. Additional resilient members may be positioned around the outside periphery of the base, intermediate baffle, or upper baffle members, or between any of the base, intermediate baffle, or upper baffle members.

In examples, there may be a method of deploying a light baffle assembly comprising operating the actuator configured to release a connection between a base baffle member and an upper baffle member. Upon operating the actuator, the resilient member may extend the upper baffle member away from the base baffle member.

The examples of the Application may provide for a simple, reliable deployable baffle well suited to the constraints of a miniaturized cubesat environment.

The example light baffle assembly described herein may further provide the additional benefit of not obscuring the field of view of the star tracker when stowed, prior to deployment in flight. This may prevent a possible star tracker failure mode in the event that a light baffle component failed to deploy after launch.

The invention claimed is:

1. A light baffle assembly comprising:
a first baffle member comprising a first wall portion positioned substantially parallel to a longitudinal axis, the first wall portion including a minimum first wall distance to the longitudinal axis of the light baffle assembly;
a second baffle member comprising a second wall portion coupled to a second blade portion, the second wall portion positioned substantially parallel to the longitudinal axis and including a maximum second wall distance to the longitudinal axis of the light baffle assembly, and the second blade portion positioned to extend inwards from the second wall portion towards the longitudinal axis; and
a resilient member configured to extend the second baffle member away from the first baffle member,
wherein the minimum first wall distance is less than the maximum second wall distance to the longitudinal axis of the light baffle assembly and the light baffle assembly extends beyond the lens assembly.

2. The light baffle assembly of claim 1, further comprising:
a first additional baffle member comprising a first additional wall portion coupled to a first additional blade portion, the first additional wall portion substantially parallel to the longitudinal axis, and the first additional blade portion positioned to extend inwards away from the first additional wall portion towards the longitudinal axis,
wherein the first additional baffle is positioned adjacent to the second baffle member.

3. The light baffle assembly of claim 2, further comprising:
a second additional baffle member comprising a second additional wall portion coupled to a second additional blade portion, the second additional wall portion substantially parallel to the longitudinal axis, and the second additional blade portion positioned to extend inwards away from the second additional wall portion towards the longitudinal axis,
wherein the second additional baffle is positioned adjacent to the first additional baffle member.

4. The light baffle assembly of claim 1, wherein a distal end baffle member positioned at a distal end of the light baffle assembly includes a resilient member seat.

5. The light baffle assembly of claim 4, wherein the resilient member seat forms an annular groove.

6. The light baffle assembly of claim 1, further comprising:
an actuator configured to release a connection between at least two baffle members of the light baffle assembly.

7. The light baffle assembly of claim 1, wherein the second baffle member and the first baffle member are formed from a continuous strip of material.

8. The light baffle assembly of claim 7, wherein the resilient member is integrated into the continuous strip of material.

9. A method for deploying a light baffle assembly comprising:
operating an actuator configured to release a connection between at least two baffle members of the light baffle assembly, wherein a resilient member is configured to extend a second baffle member away from a first baffle member, the first baffle member comprising a first wall portion positioned substantially parallel to a longitudinal axis, the first wall portion including a minimum first wall distance to a longitudinal axis of the light baffle assembly, and the second baffle member comprising an second wall portion coupled to an second blade portion, the second wall portion positioned substantially parallel-to the longitudinal axis and including a maximum second wall distance to the longitudinal axis of the light baffle assembly, and the second blade portion positioned to extend inwards from the second wall portion towards the longitudinal axis, wherein the minimum first wall distance is less than the maximum second wall distance to the longitudinal axis of the light baffle assembly, and the light baffle assembly extends beyond the lens assembly.

10. The light baffle assembly of claim 1, wherein the resilient member surrounds at least one baffle of the light baffle assembly.

11. The light baffle assembly of claim 1, further comprising:
a lens assembly coupled to the first baffle member.

12. The light baffle assembly of claim 1, wherein the second baffle member further includes a second baffle lower angled section between the second wall portion and the second blade portion, and the first baffle member further includes a first baffle upper angled section adjacent to the first wall portion, and wherein the second light baffle lower angled section is configured to rest against the first baffle upper angled section when the light baffle assembly is in a stowed position.

13. The light baffle assembly of claim 2, wherein the second baffle member further includes a second baffle upper angled section between the second wall portion and the second blade portion, and the first additional baffle member further includes a first additional baffle lower angled section between the first additional wall portion and the first additional blade portion, and wherein the second light baffle upper angled section is configured to rest against the first additional baffle lower angled section when the light baffle assembly is in a stowed position.

14. The light baffle assembly of claim 1, wherein the second baffle member is nested within the first baffle member when the light baffle assembly is in a stowed position.

* * * * *

UNITED STATES PATENT AND TRADEMARK OFFICE
CERTIFICATE OF CORRECTION

PATENT NO. : 10,066,985 B2  
APPLICATION NO. : 15/337697  
DATED : September 4, 2018  
INVENTOR(S) : Stephen Steg Page 1 of 1

It is certified that error appears in the above-identified patent and that said Letters Patent is hereby corrected as shown below:

On the Title Page

(12) Replace "Stephen" with --Steg--

(72) Inventor: replace "Steg Stephen" with --Stephen Steg--

Signed and Sealed this  
Nineteenth Day of November, 2019

Andrei Iancu  
*Director of the United States Patent and Trademark Office*